United States Patent
Nichols et al.

(10) Patent No.: US 8,490,408 B2
(45) Date of Patent: Jul. 23, 2013

(54) CONTINUOUS SLOT IN SHROUD

(75) Inventors: Jason Nichols, Mississauga (CA); Hien Duong, Mississauga (CA); Peter Townsend, Mississauga (CA); Grigory Rukin, Vaughan (CA)

(73) Assignee: Pratt & Whitney Canada Copr., Longueuil, Quebec ( * ) Notice: Subject to any disclaimer, the term of this patent is extended or adjusted under 35 U.S.C. 154(b) by 1033 days.

(21) Appl. No.: 12/508,903

(22) Filed: Jul. 24, 2009

(65) Prior Publication Data

US 2011/0016877 A1   Jan. 27, 2011

(51) Int. Cl.
*F02C 6/08* (2006.01)

(52) U.S. Cl.
USPC ................................. 60/782; 60/785

(58) Field of Classification Search
USPC .............. 60/782, 785; 415/169.1, 173.1, 115, 415/116
See application file for complete search history.

(56) References Cited

U.S. PATENT DOCUMENTS

| | | | |
|---|---|---|---|
| 3,451,215 A * | 6/1969 | Barr | 60/787 |
| 4,280,792 A | 7/1981 | Hartel et al. | |
| 4,551,064 A | 11/1985 | Pask | |
| 4,573,865 A | 3/1986 | Hsia et al. | |
| 5,143,512 A | 9/1992 | Corsmeier et al. | |
| 5,197,852 A | 3/1993 | Walker et al. | |
| 5,407,320 A | 4/1995 | Hutchinson | |
| 5,482,435 A | 1/1996 | Dorris et al. | |
| 5,649,806 A | 7/1997 | Scricca et al. | |
| 5,997,245 A | 12/1999 | Tomita et al. | |
| 6,179,557 B1 | 1/2001 | Dodd et al. | |
| 6,254,333 B1 | 7/2001 | Merry | |
| 7,118,325 B2 | 10/2006 | Kvasnak et al. | |
| 7,147,431 B2 | 12/2006 | Maguire et al. | |
| 7,284,954 B2 | 10/2007 | Parker et al. | |
| 7,296,967 B2 | 11/2007 | Shapiro | |
| 7,354,241 B2 | 4/2008 | Djeridane et al. | |
| 7,374,395 B2 | 5/2008 | Durocher et al. | |
| 7,520,719 B2 | 4/2009 | Janke et al. | |
| 2005/0158173 A1* | 7/2005 | Nguyen et al. | 415/208.3 |
| 2009/0232642 A1* | 9/2009 | Anema | 415/145 |

* cited by examiner

*Primary Examiner* — Phutthiwat Wongwian
*Assistant Examiner* — Vikansha Dwivedi
(74) *Attorney, Agent, or Firm* — Norton Rose Fulbright Canada LLP

(57) ABSTRACT

A compressor shroud has a continuous slot defined in a gas-path side surface thereof for communicating through the body of the shroud. Spaced-apart structural bridges span a rear portion of the slot in the shroud to maintain structural rigidity of the shroud. The method of forming the continuous slot is also described.

6 Claims, 3 Drawing Sheets

CONTINUOUS SLOT IN SHROUD

TECHNICAL FIELD

The present application relates to a compressor shroud and, more particularly, to a slot arrangement for communicating air through the shroud.

BACKGROUND ART

The engine air system of a gas turbine engine requires extraction of compressed air from the gaspath to support cooling flow and bearing pressurization in the engine, among other things. The air pressure needed requires extraction of the bleed air from a suitable location, such as mid-way through the centrifugal stage of the compressor. An aerodynamic design of the bleed geometry helps minimize losses in the bleed system and preserve the flow structure through the impeller.

A known bleed system uses a plurality of discrete bleed holes to extract flow through the impeller shroud into the bleed cavity. Air is drawn from the gaspath at the discrete locations of the holes on the shroud. While such a bleed system is operational, improvements are desired in various regards.

SUMMARY

According a broad aspect of the application, there is provided a compressor shroud surrounding a compressor rotor in a gaspath of a gas turbine engine, the shroud comprising a body having a gaspath side surface and a back side surface, a continuous circumferential slot defined in the gaspath side surface of the body of the shroud for communicating air through the shroud between said surfaces, and spaced-apart structural bridges provided on said back side surface of the body and spanning the continuous circumferential slot to maintain structural integrity of the shroud.

According to a still further broad aspect, there is provided a method of forming a continuous bleed slot in an compressor shroud of a gas turbine engine, the method comprising: forming a continuous circumferential slot in a gas path side surface of said shroud and forming spaced-apart structural bridges in a rear surface of said shroud spanning portions of said slot to maintain structural rigidity of said shroud.

In accordance with another general aspect, there is provided an impeller shroud having a bleed slot for bleeding air from a pressurized gaspath in a centrifugal stage of a gas turbine engine, the bleed slot is a continuous slot formed in a gas path side surface of the impeller shroud, circumferentially spaced-apart structural bridges span a rear portion of the slot in the shroud to maintain structural rigidity of the shroud.

In accordance with a still further aspect, there is provided an impeller shroud surrounding an impeller extending into a gaspath of a gas turbine engine, the impeller shroud comprising a body having a gaspath side surface and a back side surface, a continuous circumferential bleed slot defined in the gaspath side surface of the body of the impeller shroud for bleeding air from the gaspath in a centrifugal stage of the gas turbine engine, and spaced-apart structural bridges provided on said back side surface of the body and spanning the bleed slot to maintain structural integrity of the impeller shroud.

BRIEF DESCRIPTION OF DRAWINGS

Reference is now made to the accompanying figures, in which.

DETAILED DESCRIPTION

Figure 1:
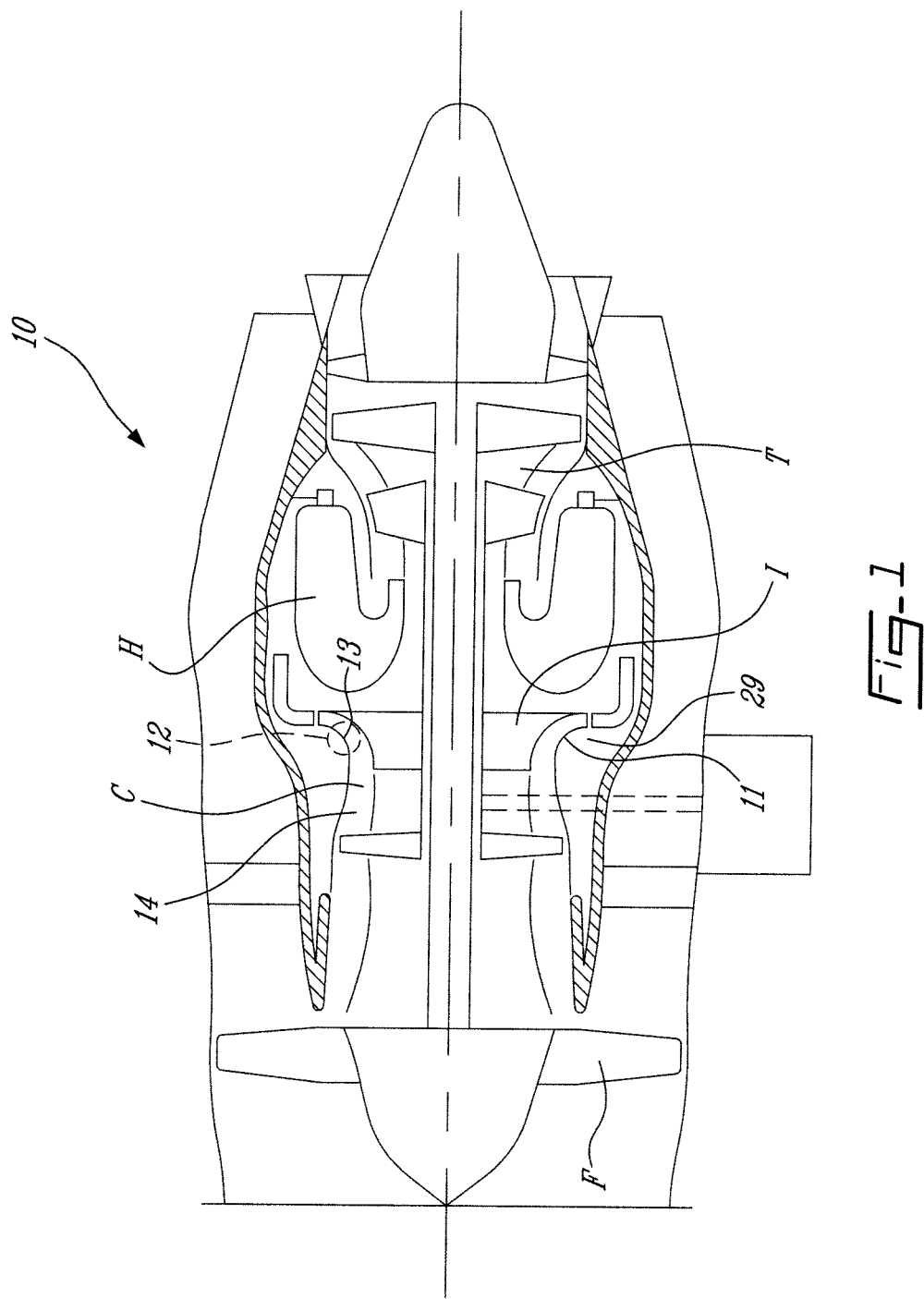
FIG. 1 is a schematic cross sectional view of a gas turbine engine, partly fragmented, to show the location of an example of an impeller shroud.

FIG. 1 illustrates a turbofan gas turbine engine 10 of a type preferably provided for use in subsonic flight, generally comprising in serial flow communication a fan F through which ambient air is propelled, a multistage compressor C for pressurizing the air, a combustor H in which the compressed air is mixed with fuel and ignited for generating an annular stream of hot combustion gases, and a turbine section T for extracting energy from the combustion gases.

The compressor C comprises, amongst others, an impeller shroud 11 surrounding an impeller I. The impeller shroud 11 is provided with a continuous bleed slot 13 at an axial location 12 which is substantially mid-way through the centrifugal stage of the compressor C. As will be seen hereinafter, air is compressed in the gaspath 14 flowing against the impeller side surface or gaspath side surface 15 of the impeller shroud 11 and is extracted through the bleed slot 13 to support cooling airflow and bearing pressurization in the engine 10.

Figure 2:
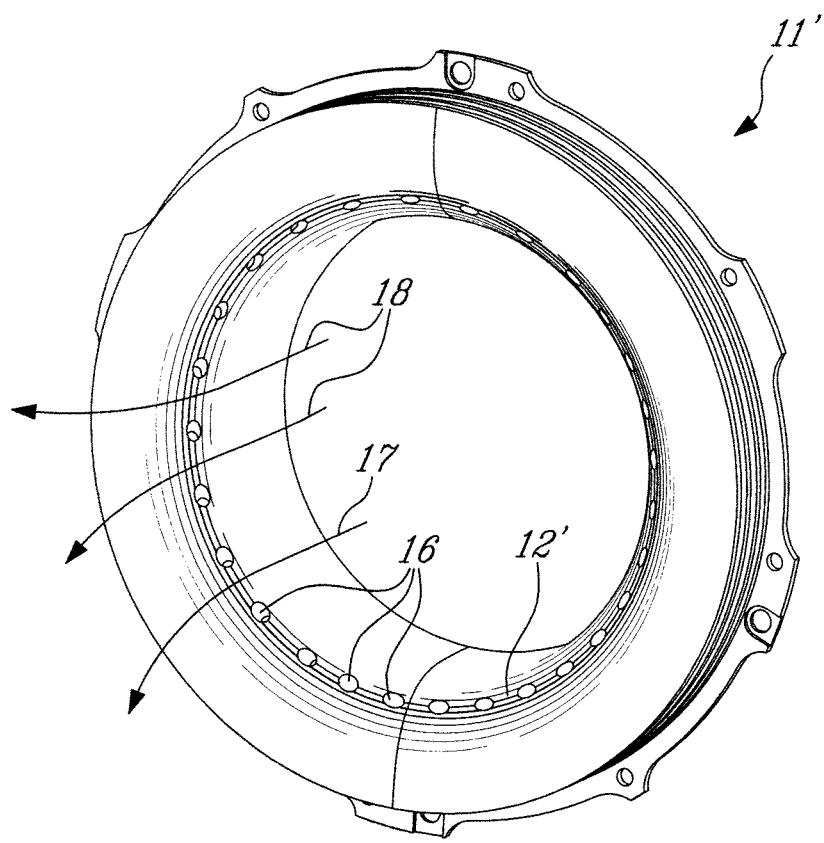
FIG. 2 is a perspective view of an impeller shroud of the prior art.
Figure 3:
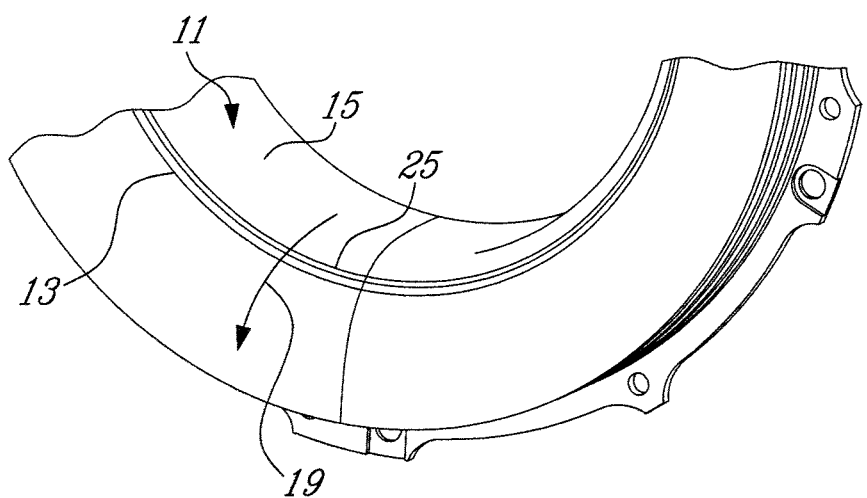
FIG. 3 is a fragmented perspective view showing an impeller shroud having a continuous circumferential slot formed on a gaspath side thereof.

Referring now to FIG. 2, there is shown a prior art impeller shroud 11' which is provided with an series of spaced-apart bleed holes 16 in the curved portion 12' of the impeller shroud 11'. The pressurized gas flow in the gaspath flows against the gaspath side surface of the shroud in a curved direction from axial to radial as indicated by arrow 17 and some of the air is extracted by the holes 16 from the pressurized gas flow. Because the holes 16 are spaced-apart, air is only drawn from the gaspath 14 at a location of the holes 16 but some of the air will pass between each hole as indicated by arrows 18 and this causes a disruption in the pressurized gas flow which could create possible flow separation and additional losses which are undesirable.

With reference now to FIGS. 3 to 6, there will be described the improved impeller shroud 11. As hereinshown, the impeller shroud 11 is provided with a continuous circumferential bleed slot 13 formed on the impeller side surface 15 of the shroud for substantially and uniformly extracting air from the gaspath flowing thereagainst as illustrated by arrow 19.

Figure 4:
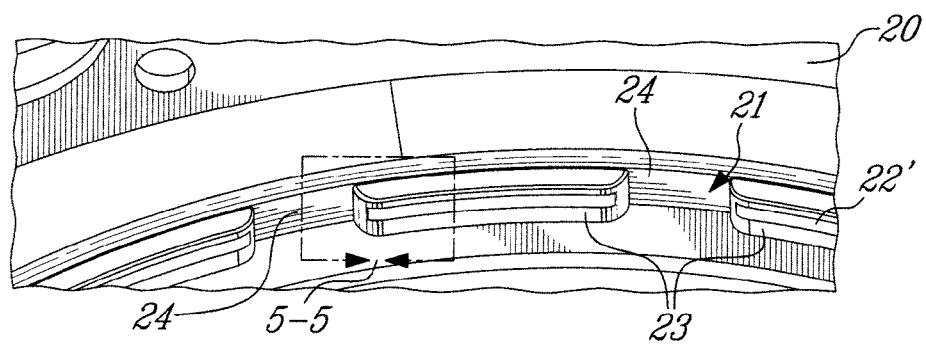
FIG. 4 is a back view of the shroud showing the spaced-apart structural ribs with through slot portions of the circumferential slot extending therebetween.
Figure 5:
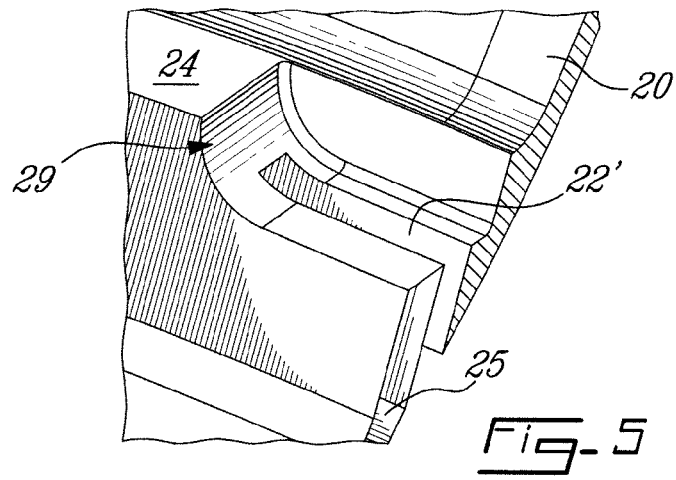
FIG. 5 is an exploded view of a section of a structural rib where it communicates with the through slot portion.
Figure 6:
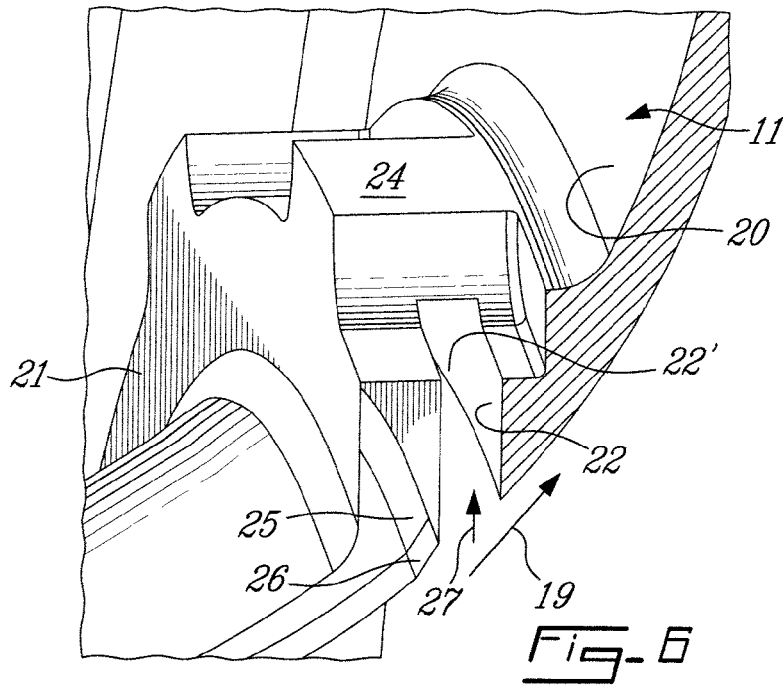
FIG. 6 is a further fragmented perspective view illustrating the construction of the continuous slot and the leading edge of the slot.

As shown in FIGS. 4 to 6, the rear or back side surface 20 of the shroud 11 opposite to the impeller side surface 15 thereof has a reinforced section 21 which protrudes rearwardly therefrom and the bleed slot 13 is formed in this section.

The bleed slot 13 is formed in the impeller side surface 15 without fully penetrating the thickness of the reinforced section 21 to form a continuous trench 22. A proper milling tool can be used to form the trench. After the trench is formed, the shroud 11 can be milled with a milling tool which is adapted to route the reinforced section 21 in spaced-apart sections 23 excavating material until the trench 22 is exposed, thus forming a through bore slot 22' communicating across the wall of the shroud. The unmilled areas between the milled sections 23 form circumferentially spaced-apart structural bridges 24 in a rear portion of the slot 13 formed in the shroud whereby to maintain structural rigidity of the shroud. With the embodiment as hereinshown there are sixteen of these structural bridges 24 formed about the bleed slot 13 in the rear surface of the shroud 11.

The bleed slot 13 thus communicates with a bleed cavity 29 behind the shroud to support cooling air flow and bearing pressurization in the engine.

In order to assist the extraction of bleed air from the pressurized gas path 14, a feature, such as a chamfer 25 or radius is formed in the impeller shroud 11 in a leading edge 26 of the slot 13. This chamfer 25 assists in directing bleed air from the pressurized gaspath identified by arrow 19 by facilitating the entry of bleed airflow into the slot as indicated by arrow 27. The bleed air curves into the slot 13.

The impact on rotor dynamics is considerably reduced since the bridge points are on the back side surface of the impeller shroud (i.e. a continuous slot is offered to the gaspath side of the impeller shroud, the bridge points are on the back side). The pressure recovery is improved as compared with conventional hole designs. The slot 13 contributes to reduce the air system requirement for higher pressure air (fewer losses) and provide the compressor with better pressure ratio and efficiency.

The above description is meant to be exemplary only, and one skilled in the art will recognize that changes may be made to the embodiment described therein without departing from the scope of the invention disclosed. For example, such a slot arrangement may be used for injecting flow into the gas path in the region of the compressor rotor, such as upstream of a rotor tip treatment, and thus is not limited for use in extracting bleed. The present approach may be employed in any suitable gas turbine engine and, further, is not limited for use with centrifugal compressors, but rather may be used with any suitable compressor design. It is therefore within the ambit of present invention to cover any obvious modifications provided that these modifications fall within the scope of the appended claims.

What is claimed is:

1. An impeller shroud surrounding a compressor impeller in a gaspath of a gas turbine engine, the shroud comprising a body having a gaspath side surface and a back side surface, a continuous circumferential slot defined in the gaspath side surface of the body of the shroud for communicating air through the shroud between said surfaces, and spaced-apart structural bridges provided on said back side surface of the body and spanning the continuous circumferential slot to maintain structural integrity of the shroud, wherein there is further provided a feature comprising one of a chamfer and a radius formed in said gaspath side surface of the shroud in a leading edge of the slot on an upstream side thereof, said feature configured to assist in directing bleed air from the gaspath.

2. A shroud as claimed in claim 1, wherein said structural bridges are integrally formed sections of said body and recessed in said slot.

3. The impeller shroud as claimed in claim 1, wherein said structural bridges are integrally formed sections of said shroud and recessed in said slot from the back side of the shroud opposite to said gas path side surface thereof.

4. A method of forming a bleed structure in a compressor impeller shroud of a gas turbine engine, the method comprising: forming a continuous circumferential bleed slot in a gas path side surface of said shroud and forming spaced-apart structural bridges in a rear surface of said shroud spanning portions of said slot to maintain structural rigidity of said shroud, wherein forming said continuous circumferential bleed slot comprises uniformly cutting said slot from the gaspath side surface of said shroud without fully penetrating the thickness of said shroud to form a continuous trench, and then converting the trench into spaced-apart through slots from said rear surface of said shroud with areas between said through slots constituting said structural bridges.

5. A method as claimed in claim 4, wherein said continuous trench is formed in a reinforced section of said shroud, said spaced apart slots being formed by a milling tool adapted to route said reinforced section to said trench in spaced-apart sections thereof from a rear side of said shroud to form said through slots, said reinforced sections between said spaced-apart sections forming said structural bridges.

6. A method as claimed in claim 4, further comprising forming a chamfer in said gas path side surface on an upstream edge of said circumferential bleed slot.

* * * * *